(12) United States Patent
Kang et al.

(10) Patent No.: US 9,369,224 B2
(45) Date of Patent: Jun. 14, 2016

(54) CLOCK SYNCHRONIZATION METHOD AND DEVICE

(71) Applicant: Huawei Technologies Co., Ltd., Shenzhen (CN)

(72) Inventors: Daxiang Kang, Shanghai (CN); Huaguo Xie, Shenzhen (CN); Gaowei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/080,998

(22) Filed: Nov. 15, 2013

(65) Prior Publication Data

US 2014/0211780 A1    Jul. 31, 2014

Related U.S. Application Data

(63) Continuation of application No. PCT/CN2013/080458, filed on Jul. 31, 2013.

(30) Foreign Application Priority Data

Jan. 30, 2013    (CN) .......................... 2013 1 0037499

(51) Int. Cl.
*H04J 3/06* (2006.01)
*H04W 8/22* (2009.01)
(Continued)

(52) U.S. Cl.
CPC ............... *H04J 3/0667* (2013.01); *H04W 8/22* (2013.01); *H04W 76/02* (2013.01); *H04L 45/50* (2013.01); *H04W 8/245* (2013.01); *H04W 28/18* (2013.01)

(58) Field of Classification Search
CPC ....... H04L 45/00; H04L 12/4633; H04L 7/00; H04L 7/0012; H04L 7/0016; H04L 45/121; H04L 45/123; H04L 41/5009; H04W 28/18; H04W 76/02; H04W 8/22; H04W 8/245
See application file for complete search history.

(56) References Cited

U.S. PATENT DOCUMENTS 7,649,910 B1 *    1/2010    Wechsler ............... H04J 3/0688
                                                              370/503
2007/0274212 A1 *  11/2007    Kolenchery ............ H04L 12/28
                                                              370/232
(Continued)

FOREIGN PATENT DOCUMENTS

CN    101436923 A    5/2009
CN    102006660 A    4/2011
(Continued)

OTHER PUBLICATIONS

Foreign Communication From a Counterpart Application, PCT Application No. PCT/CN2013/080458, Chinese Search Report dated Oct. 3, 2013, 7 pages.
(Continued)

*Primary Examiner* — Raj Jain
(74) *Attorney, Agent, or Firm* — Conley Rose, P.C.; Grant Rodolph; Adam J. Stegge

(57) ABSTRACT

Embodiments of the present invention provide a clock synchronization method and device. The method includes: receiving, a preconfigured multi-protocol label switching (MPLS) capability parameter and a traffic engineering (TE) capability parameter, and establishing, based on the MPLS capability parameter and the TE capability parameter, an MPLS tunnel interface; establishing, an MPLS TE tunnel whose bidirectional paths are consistent between the first clock synchronization device and a second clock synchronization device; and performing, clock synchronization message interaction with the second clock synchronization device through the established MPLS TE tunnel. In the embodiments of the present invention, by establishing the MPLS TE tunnel whose bidirectional paths are consistent between the first clock synchronization device and the second clock synchronization device which perform clock synchronization message interaction, symmetry of clock synchronization message interaction paths is ensured, and therefore, a time error in clock synchronization resulting from asymmetry of the paths is avoided.

15 Claims, 7 Drawing Sheets

(51) Int. Cl.
*H04W 76/02* (2009.01)
*H04W 28/18* (2009.01)
*H04W 8/24* (2009.01)
*H04L 12/723* (2013.01)

(56) References Cited

U.S. PATENT DOCUMENTS

| | | | | |
|---|---|---|---|---|
| 2010/0290367 | A1* | 11/2010 | Karandikar | H04L 12/437 370/256 |
| 2011/0032844 | A1* | 2/2011 | Patel | H04L 45/02 370/255 |
| 2011/0305307 | A1* | 12/2011 | Wang | H04J 3/0667 375/362 |
| 2013/0010790 | A1* | 1/2013 | Shao | H04L 45/16 370/390 |
| 2013/0212268 | A1* | 8/2013 | Fu et al. | 709/224 |

FOREIGN PATENT DOCUMENTS

| | | |
|---|---|---|
| CN | 102340438 A | 2/2012 |
| CN | 102447612 A | 5/2012 |
| CN | 103166729 A | 6/2013 |
| EP | 2461501 A1 | 6/2012 |
| EP | 2624505 A1 | 8/2013 |
| WO | 2010063242 A1 | 6/2010 |
| WO | 2012007276 A1 | 1/2012 |

OTHER PUBLICATIONS

Foreign Communication From a Counterpart Application, PCT Application No. PCT/CN2013/080458, Chinese Written Opinion dated Oct. 3, 2013, 5 pages.

Partial English Translation and Abstract of Chinese Patent Application No. CN102006660A, Jan. 2, 2014, 5 pages.

Partial English Translation and Abstract of Chinese Patent Application No. CN102340438A, Jan. 2, 2014, 7 pages.

"IEEE Standard for a Precision Clock Synchronization Protocol for Networked Measurement and Control Systems, IEEE Instrumentation and Measurement Society," Technical Committee on Sensor Technology (TC-9), IEEE Std 1588, Jul. 24, 2008, 289 pages.

Davari, S., "Transporting Timing Messages Over MPLS Networks," draft-ietf-tictoc-1588overmpls-03, Oct. 22, 2012, 36 pages.

Foreign Communication From a Counterpart Application, European Application No. 13789469.7, Extended European Search Report dated Oct. 21, 2014, 9 pages.

* cited by examiner

CLOCK SYNCHRONIZATION METHOD AND DEVICE

CROSS-REFERENCE TO RELATED APPLICATIONS

This application is a continuation of International Application No. PCT/CN2013/080458, filed on Jul. 31, 2013, which claims priority to Chinese Patent Application No. 201310037499.9, filed on Jan. 30, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communications technologies, and in particular, to a clock synchronization method and device.

BACKGROUND

In a communications system, some devices have clock synchronization requirements, for example, in a wireless bearer network, it is required that a radio base station is provided with a synchronous clock reference source; when a soft handover is performed between radio base stations, if clock synchronization is not performed between a radio network controller (RNC) and a base station (e.g., a NodeB), a call may not be able to be established, and time and frequency deviations further affect a handover success rate of a mobile station (MS) between base stations.

In the prior art, clock synchronization between networks is implemented based on an Institute of Electrical and Electronics Engineers (IEEE) 1588V2 protocol; in the solution, a time source is acquired by means of a global positioning system (GPS) and the like, and a bearer device transmits time information through the 1588V2 protocol, a base station acquires the time information from the bearer device so as to achieve a purpose of synchronizing with the time source; the bearer device as a clock server may be a standalone device, and may also be integrated in a device such as a router.

However, with the development of a communications network, a network device in an existing network architecture also adopts an Internet Protocol (IP) protocol to exchange a clock synchronization message with a clock server based on the 1588V2 protocol. The IP protocol is connectionless; therefore, there may be multiple paths between a device with a clock synchronization requirement and a clock server, and especially, when the device and the clock server cross different types of networks, for example, physical media of networks where the device and the clock server are located are different, one is an Ethernet and the other is an optical switching network; or the device and the clock server belong to different operators or belong to different operating services of the same operator; in these situations, the device with the clock synchronization requirement and the clock server may transmit a packet through different paths, and therefore an error occurs during clock synchronization.

SUMMARY

The present invention provides a clock synchronization method and device, so as to solve an error problem in clock synchronization between a network device and a clock server.

According to a first aspect of the present invention, a clock synchronization method is provided, where the method includes: receiving, by a first clock synchronization device, a preconfigured multi-protocol label switching (MPLS) capability parameter and a traffic engineering (TE) capability parameter, and establishing, based on the MPLS capability parameter and the TE capability parameter, an MPLS tunnel interface; establishing, by the first clock synchronization device according to the MPLS tunnel interface, an MPLS TE tunnel whose bidirectional paths are consistent between the first clock synchronization device and a second clock synchronization device; and performing, by the first clock synchronization device, clock synchronization message interaction with the second clock synchronization device through the established MPLS TE tunnel.

With reference to the first aspect, in a first possible implementation manner of the first aspect, the first clock synchronization device is a clock server, and the second clock synchronization device is a network device; or the first clock synchronization device is a network device, and the second clock synchronization device is a clock server.

With reference to the first possible implementation manner of the first aspect, in a second possible implementation manner of the first aspect, when the first clock synchronization device is a clock server and the second clock synchronization device is a network device, the establishing an MPLS TE tunnel between the first clock synchronization device and a second clock synchronization device according to the MPLS tunnel interface includes: receiving, by the clock server, a unicast negotiation message including a bidirectional path consistency parameter and sent by the network device, where the unicast negotiation message is used to request authorization from the clock server, and the bidirectional path consistency parameter is used to negotiate on establishing the MPLS TE tunnel whose bidirectional paths are consistent; and after the clock server authenticates the network device according to the unicast negotiation message, sending a unicast authorization message to the network device, so as to authorize the network device; and after the network device receives the unicast authorization message, establishing the MPLS TE tunnel whose bidirectional paths are consistent between the clock server and the network device according to the bidirectional path consistency parameter and the MPLS tunnel interface.

With reference to the first possible implementation manner of the first aspect, in a third possible implementation manner of the first aspect, when the first clock synchronization device is a clock server and the second clock synchronization device is a network device, the performing, by the first clock synchronization device, clock synchronization message interaction with the second clock synchronization device through the established MPLS TE tunnel includes: sending, by the clock server, a synchronization message to the network device at a first moment, where the synchronization message includes a timestamp recording the first moment, so that after the network device receives the synchronization message at a second moment, the network device extracts the first moment from the synchronization message, records the second moment, sends a time delay request message to the clock server at a third moment and meanwhile records the third moment; and receiving, by the clock server, the time delay request message at a fourth moment, and sending a time delay response message to the network device, where the time delay response message includes a timestamp recording the fourth moment, so that the network device receives the time delay response message, extracts the fourth moment from the time delay response message, calculates a transmission delay according to the first moment, the second moment, the third moment, and the fourth moment, and adjusts a local clock according to the transmission delay, so as to achieve time synchronization with the clock server.

With reference to the third possible implementation manner of the first aspect, in a fourth possible implementation manner of the first aspect, before the sending, by the clock server, a synchronization message to the network device at a first moment, the method further includes: receiving, by the clock server, a synchronization request message for requesting clock synchronization sent by the network device; and sending, by the clock server, a synchronization authorization message to the network device according to the synchronization request message, so as to respond to the synchronization request message; and the sending, by the clock server, a synchronization message to the network device at a first moment includes: after the clock server sends the synchronization authorization message, sending the synchronization message to the network device at the first moment.

According to a second aspect of the present invention, a clock synchronization device is provided, where the clock synchronization device is a first clock synchronization device; the first clock synchronization device includes: a receiving module configured to receive a preconfigured MPLS capability parameter and a TE capability parameter, and establish, based on the MPLS capability parameter and the TE capability parameter, an MPLS tunnel interface; a tunnel establishment module configured to establish, according to the MPLS tunnel interface, an MPLS TE tunnel whose bidirectional paths are consistent between the first clock synchronization device and a second clock synchronization device; and a message interaction module configured to perform clock synchronization message interaction with the second clock synchronization device through the established MPLS TE tunnel.

With reference to the second aspect, in a first possible implementation manner of the second aspect, the second clock synchronization device is a network device, or the second clock synchronization device is a clock server.

With reference to the first possible implementation manner of the second aspect, in a second possible implementation manner of the second aspect, when the second clock synchronization device is a network device, the tunnel establishment module includes: a first receiving unit configured to receive a unicast negotiation message including a bidirectional path consistency parameter and sent by the network device, where the unicast negotiation message is used to request authorization from the clock server, and the bidirectional path consistency parameter is used to negotiate on establishing the MPLS TE tunnel whose bidirectional paths are consistent; and an establishment unit configured to, after the network device is authenticated according to the unicast negotiation message, send a unicast authorization message to the network device, so as to authorize the network device; and after the network device receives the unicast authorization message, establish the MPLS TE tunnel whose bidirectional paths are consistent between the clock server and the network device according to the bidirectional path consistency parameter and the MPLS tunnel interface.

With reference to the first possible implementation manner of the second aspect, in a third possible implementation manner of the second aspect, when the second clock synchronization device is a network device, the message interaction module includes: a sending unit configured to send a synchronization message to the network device at a first moment, where the synchronization message includes a timestamp recording the first moment, so that after the network device receives the synchronization message at a second moment, the network device extracts the first moment from the synchronization message, records the second moment, sends a time delay request message to the clock server at a third moment and meanwhile records the third moment; and a second receiving unit configured to receive the time delay request message at a fourth moment, and send a time delay response message to the network device, where the time delay response message includes a timestamp recording the fourth moment, so that the network device receives the time delay response message, extracts the fourth moment from the time delay response message, calculates a transmission delay according to the first moment, the second moment, the third moment, and the fourth moment, and adjusts a local clock according to the transmission delay, so as to achieve time synchronization with the clock server.

With reference to the third possible implementation manner of the second aspect, in a fourth possible implementation manner of the second aspect, the receiving module is further configured to receive a synchronization request message for requesting clock synchronization sent by the network device through the established MPLS TE tunnel; and the clock synchronization device further includes: a sending module configured to send a synchronization authorization message to the network device according to the synchronization request message, so as to respond to the synchronization request message; and the sending unit, specifically configured to: after the synchronization authorization message is sent, send the synchronization message to the network device at the first moment.

In the embodiments of the present invention, by establishing the MPLS TE tunnel whose bidirectional paths are consistent between the first clock synchronization device and the second clock synchronization device that perform clock synchronization message interaction, symmetry of clock synchronization message interaction paths is ensured, and therefore, a time error in clock synchronization resulting from asymmetry of the paths is avoided.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
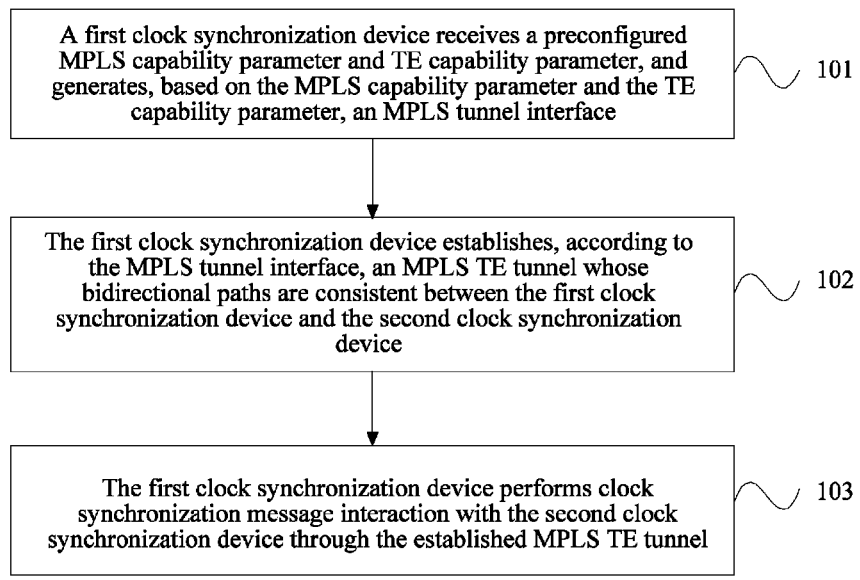
FIG. 1 is a flow chart of an embodiment of a clock synchronization method provided in the present invention.

FIG. 1 is a flow chart of an embodiment of a clock synchronization method provided in the present invention; the method is applicable to a process of clock synchronization between a network device and a clock server, and in particular, to a solution of clock synchronization based on an IEEE1588V2 protocol. The method in this embodiment is executed by a clock synchronization device, where the device may be implemented by using hardware and/or software. As shown in FIG. 1, the method includes the following steps:

S101: A first clock synchronization device receives a preconfigured MPLS capability parameter and a TE capability parameter, and generates, based on the MPLS capability parameter and the TE capability parameter, an MPLS tunnel interface.

Specifically, when the MPLS capability parameter and the TE capability parameter are configured for the first clock synchronization device, the same MPLS capability parameter and TE capability parameter are also configured for the second clock synchronization device corresponding to the first clock synchronization device at the same time; after the MPLS capability parameter and TE capability parameter are configured, the first clock synchronization device and the second clock synchronization device may generate an MPLS tunnel interface according to the configured MPLS capability parameter and TE capability parameter; definitely, the MPLS tunnel interface may also be manually configured on the first clock synchronization device and the second clock synchronization device.

The first clock synchronization device or the second clock synchronization device in this embodiment may be a clock server or a network device; specifically, the clock server may be connected to a satellite device or another device that provides a time source, and is configured to acquire an initial accurate time source; the network device may be a device that has a time synchronization requirement, for example, a base station, and generally, the number of the network element devices is large and costs of the network element devices are low.

S102: The first clock synchronization device establishes, according to the MPLS tunnel interface, an MPLS TE (Co-routed) tunnel whose bidirectional paths are consistent between the first clock synchronization device and the second clock synchronization device.

S103: The first clock synchronization device performs clock synchronization message interaction with the second clock synchronization device through the established MPLS TE tunnel.

In this embodiment, the established MPLS TE tunnel whose bidirectional paths are consistent has label switching paths (LSP) that are opposite in directions, and the LSPs that are opposite in directions are the same; therefore, it can be ensured that the paths that are traversed are symmetrical when the network device performs message interaction with the clock server. For example, when the network device sends a packet 1 to the clock server, if a path traverses a router 1→a router 2→a router 5→a router 4, the path is definitely the router 4→the router 5→the router 2→the router 1 when the clock server sends or returns a packet to the network device, and the path is not changed when another message interaction is performed.

In this embodiment, by establishing the MPLS TE tunnel whose bidirectional paths are consistent between the first clock synchronization device and the second clock synchronization device that perform clock synchronization message interaction, and performing clock synchronization message interaction through the tunnel, symmetry of clock synchronization message interaction paths is ensured, and an error in clock synchronization resulting from asymmetry of the paths for receiving and sending a message may be avoided.

It should be noted that the first clock synchronization device may be a clock server, and the second clock synchronization device is a network device; or the first clock synchronization device may be a network device, and the second clock synchronization device is a clock server. During a specific implementation, clock synchronization message interaction is performed between the clock server and the network device.

Figure 2:
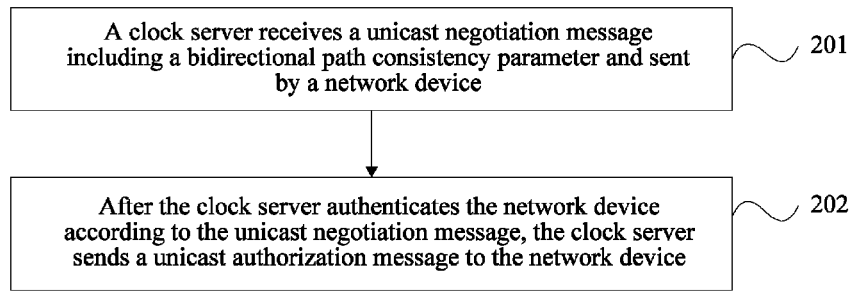
FIG. 2 is a flow chart of another embodiment of a clock synchronization method provided in the present invention.

FIG. 2 is a flow chart of another embodiment of a clock synchronization method provided in the present invention. As shown in FIG. 2, in this embodiment, when the first clock synchronization device is a clock server and the second clock synchronization device is a network device, the first clock device establishes an MPLS TE (Co-routed) tunnel whose bidirectional paths are consistent between the first clock synchronization device and the second clock synchronization device according to the MPLS tunnel interface, where a specific process includes the following steps.

S201: The clock server receives a unicast negotiation message including a bidirectional path consistency parameter and sent by the network device, where specifically, the clock server and the network device herein are devices configured with an MPLS capability parameter and a TE capability parameter. The unicast negotiation message is used to request authorization from the clock server, and the bidirectional path consistency parameter is used to negotiate on establishing the MPLS TE tunnel whose bidirectional paths are consistent.

S202: After the clock server authenticates the network device according to the unicast negotiation message, the clock server sends a unicast authorization message to the network device, so as to authorize the network device, and after the network device receives the unicast authorization message, establishes the MPLS TE tunnel according to the bidirectional path consistency parameter and the MPLS tunnel interface. It should be noted that the unicast negotiation message may be carried in a notification request message sent by the network device to the clock server, and may also be pre-agreed, where the notification request message may be used as a negotiation message. When the authentication is performed, it is determined whether the MPLS TE tunnel can be established mainly according to the bidirectional path consistency parameter carried in the unicast negotiation message; if the authentication succeeds, the unicast authorization message is sent; and if the authorization cannot be performed due to causes such as device aging, a message indicating that the authorization is not performed is returned. When the clock server sends the unicast authorization message, the clock server starts the establishment of the MPLS TE tunnel on the clock server side, and further, after the network device receives the unicast authorization message sent by the clock server, the MPLS TE tunnel is established. The bidirectional path consistency parameter is a capability parameter that enables the MPLS TE tunnel to be automatically established.

Figure 3:
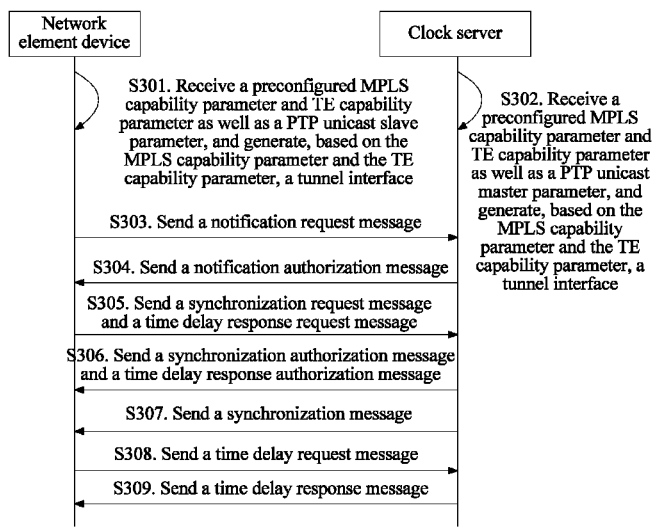
FIG. 3 is a flow chart of another embodiment of a clock synchronization method provided in the present invention.

Furthermore, in this embodiment, the first clock synchronization device performs clock synchronization message interaction with the second clock synchronization device through the established MPLS TE tunnel, so that the network device achieves time synchronization with the clock server, where a specific process is: sending, by the clock server, a synchronization message including a first moment to the network device at the first moment, where the synchronization message includes a timestamp recording the first moment, so that the network device receives the synchronization message at a second moment, extracts the first moment from the synchronization message, records the second moment, sends a time delay request message to the clock server at a third moment and meanwhile records the third moment; and receiving, by the clock server, the time delay request message at a fourth moment, and sending a time delay response message including the fourth moment to the network device, where the time delay response message includes a timestamp recording the fourth moment, so that the network device receives the time delay response message, extracts the fourth moment from the time delay response message, calculates a transmission delay according to the first moment, second moment, third moment, and fourth moment, and adjusts a local clock according to the transmission delay, so as to achieve time synchronization with the clock server; a specific calculation method is described in detail in a method embodiment shown in FIG. 3 in the following.

Furthermore, before the clock server sends a clock synchronization message to the network device at the first moment, the clock server receives a synchronization request message for requesting clock synchronization sent by the network device; and the clock server sends a synchronization authorization message to the network device according to the synchronization request message, so as to respond to the synchronization request message. It should be noted that when the network device sends the synchronization request message to the clock server, the network device may also send a time delay response request message to the clock server at the same time, so that the clock server sends a time delay response authorization message to the network device according to the time delay response request message. Therefore, the clock server sends a synchronization message to the network device at the first moment; specifically, after the clock server sends the synchronization authorization message, the clock server sends the synchronization message to the network device at the first moment; that is, the clock synchronization device needs to perform clock synchronization message interaction after the synchronization authorization and time delay response authorization are completed.

In addition, in this embodiment, after an MPLS TE tunnel is established between a local clock synchronization device and a peer end clock synchronization device, the existence of the clock server needs to be periodically determined, so that when the clock server does not provide a synchronization service, another clock server can be selected to establish a tunnel connection; therefore, in the foregoing process, after the clock server receives a synchronization request message and a time delay response message sent by the network device, if the network device does not receive a message returned by the clock server within a certain period of time, the network device reestablishes the MPLS TE tunnel with the clock server, and if the establishment fails, the network device reselects another clock server to perform the establishment of the MPLS TE tunnel.

FIG. 3 is a flow chart of another embodiment of a clock synchronization method provided in the present invention. As shown in FIG. 3, based on all the foregoing embodiments and when the clock synchronization device and the peer end clock synchronization device are specifically a clock server and a network device respectively, a whole process of the clock synchronization method includes the following steps:

S301: The network device receives a preconfigured MPLS capability parameter and TE capability parameter, generates, based on the MPLS capability parameter and the TE capability parameter, an MPLS tunnel interface, and receives a preconfigured precision time protocol (PTP) unicast slave side (slave) parameter, where after the PTP unicast slave parameter is configured, clock synchronization may be performed between the network device and the clock server by adopting a PTP principle.

S302: The clock server receives the preconfigured MPLS capability parameter and TE capability parameter, generates, based on the MPLS capability parameter and the TE capability parameter, an MPLS tunnel interface, and receives a preconfigured PTP unicast master side (master) parameter, where after the PTP unicast master parameter is configured, clock synchronization may be performed between the clock server and the network device by adopting the PTP principle.

S301 and S302 may be performed at the same time.

S303: The network device sends a notification request message to the clock server, where the notification request message may be used as a unicast negotiation message and may also carry the unicast negotiation message. The unicast negotiation message is used to request authorization from the clock server, and a bidirectional path consistency parameter carried in the unicast negotiation message is used to negotiate on establishing an MPLS TE tunnel whose bidirectional paths are consistent. In a specific implementation, the notification request message may be sent to at least two clock servers, for example, the notification request message is sent to two clock servers; if both of the two clock servers perform S304, one of the two clock servers is selected to perform a subsequent step.

S304: The clock server sends a notification authorization message to the network device, where the notification authorization message may be used as a unicast authorization message and may also carry the unicast authorization message, that is, the clock server authorizes the received unicast negotiation message and meanwhile, authorizes the establishing, by the network device through negotiation, the MPLS TE tunnel whose bidirectional paths are consistent.

It should be noted that, in S304, after the clock server sends the unicast authorization message, the clock server may automatically start the establishment of the MPLS TE tunnel from the clock server to the network device, and after the network device receives the unicast authorization message, the network device may automatically start the establishment of the MPLS TE tunnel from the network device to the clock server.

S305: The network device sends a synchronization request message and a time delay response request message to the clock server, where the synchronization request message and the time delay response request message may be included in a message.

S306: The clock server sends a synchronization authorization message and a time delay response authorization message to the network device, where definitely, the two messages may also be included in a message, as a response to the request in S305.

It should be noted that S303-S306 may be used to check the existence of the clock server and are periodically executed; if it is found that the established MPLS TE tunnel fails, the MPLS TE tunnel is reestablished, and if it is found that the original clock server is unavailable, another clock server may also be selected to establish a connection; in addition, after S303-S306 are executed, message interaction may be performed between the network device and the clock server through the MPLS TE tunnel, that is, subsequent S307-S309 can be executed.

S307: The clock server as a master sends a synchronization (sync) message to the network device at a t1 moment, and carries the t1 moment in the synchronization message; and the network device as a slave receives the synchronization message at a t2 moment, records the t2 moment, and extracts the t1 moment from the synchronization message.

S308: The network device sends a time delay request (delay-req) message to the clock server a t3 moment and records the t3 moment, and the clock server receives the time delay request message at a t4 moment and records the t4 moment.

S309: The clock server sends a time delay response (delay-resps) message to the network device, and adds the t4 moment in the time delay response message.

It should be noted that interaction is performed in S307-S309 by adopting a PTP clock synchronization principle, where a time delay of a path from the clock server to the network device is marked as delayms, a time delay of a path from the network device to the clock server is marked as delaysm, and a time deviation between the clock server and the network device is offset, in this case, t2−t1=delayms+offset and t3−t4=delaysm-offset, it can obtained that (t2−t1)−(t3−t4)=(delayms+offset)−(delaysm−offset), that is, offset= [(t2−t1)−(t3−t4)−(delayms−delaysm)]. In this embodiment, an MPLS tunnel is adopted, therefore, paths for receiving and sending a message between the clock server and the network device are symmetrical, that is, delayms=delaysm; therefore, the network device can easily obtain offset and further adjust the time of the network device to achieve synchronization with the clock server.

In this embodiment, by establishing the MPLS TE tunnel whose bidirectional paths are consistent between the clock server and the network device, it is achieved that paths for receiving and sending a message between the clock server and the network device are absolutely symmetrical, and furthermore, clock synchronization between the clock server and the network device may be easily implemented by adopting a PTP principle, and therefore, an error in the clock synchronization resulting from asymmetry of the paths for receiving and sending the message is also avoided.

Figure 4:
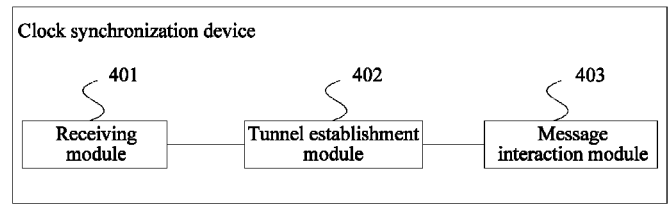
FIG. 4 is a schematic structural diagram of an embodiment of a clock synchronization device provided in the present invention.

FIG. 4 is a schematic structural diagram of an embodiment of a clock synchronization device provided in the present invention. The clock synchronization device may be the first clock device; as shown in FIG. 4, the device includes a receiving module 401, a tunnel establishment module 402, and a message interaction module 403, where: the receiving module 401 is configured to receive a preconfigured MPLS capability parameter and a TE capability parameter, and establish, based on the MPLS capability parameter and the TE capability parameter, an MPLS tunnel interface; the tunnel establishment module 402 is configured to establish, according to the MPLS tunnel interface, an MPLS TE tunnel whose bidirectional paths are consistent between the first clock synchronization device and a second clock synchronization device; and the message interaction module 403 is configured to perform clock synchronization message interaction with the second clock synchronization device through the established MPLS TE tunnel.

For the specific work of the foregoing modules, reference may be made to the method embodiment shown in FIG. 1, which is not described in detail herein.

In this embodiment, by establishing the MPLS TE tunnel whose bidirectional paths are consistent between the first clock synchronization device and the second clock synchronization device that perform clock synchronization message interaction, and performing clock synchronization message interaction through the tunnel, symmetry of clock synchronization message interaction paths is ensured, and an error in clock synchronization resulting from asymmetry of the paths for receiving and sending a message may be avoided.

The first clock synchronization device is a clock server, and the second clock synchronization device is a network device; or the first clock synchronization device is a network device, and the second clock synchronization device is a clock server.

Figure 5:
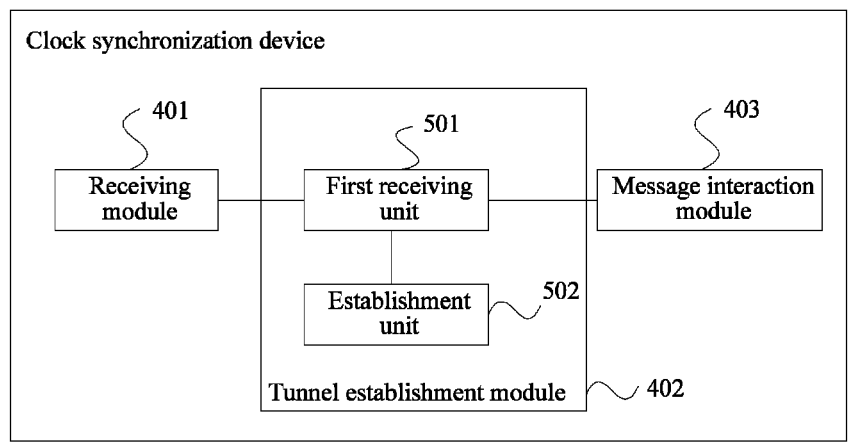
FIG. 5 is a schematic structural diagram of another embodiment of a clock synchronization device provided in the present invention.

FIG. 5 is a schematic structural diagram of another embodiment of a clock synchronization device provided in the present invention. As shown in FIG. 5, based on FIG. 4, when the first clock synchronization device is a clock server and the second clock synchronization device is a network device, the tunnel establishment module 402 includes a first receiving unit 501 and an establishment unit 502, where: the first receiving unit 501 is configured to receive a unicast negotiation message including a bidirectional path consistency parameter and sent by the network device, where the unicast negotiation message is used to request authorization from the clock server, and the bidirectional path consistency parameter is used to negotiate on establishing an MPLS TE tunnel whose bidirectional paths are consistent; and the establishment unit is configured to, after the network device is authenticated according to the unicast negotiation message, send a unicast authorization message to the network device, so as to authorize the network device, and after the network device receives the unicast authorization message, establish the MPLS TE tunnel whose bidirectional paths are consistent between the clock server and the network device according to the bidirectional path consistency parameter and an MPLS tunnel interface.

Figure 6:
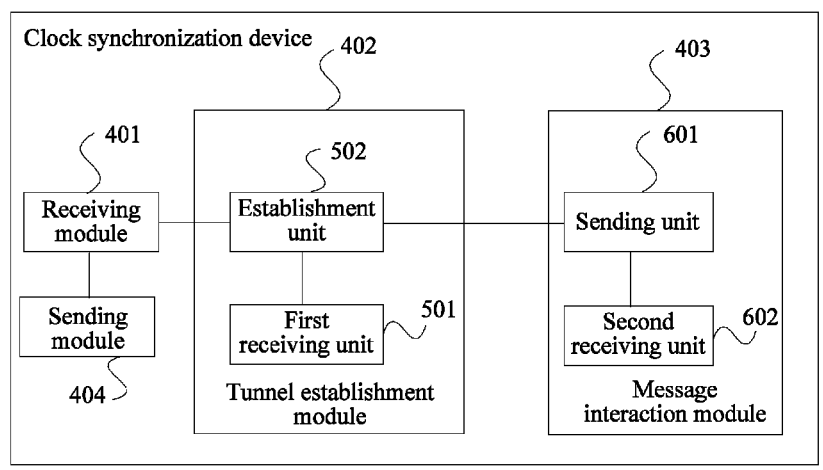
FIG. 6 is a schematic structural diagram of another embodiment of a clock synchronization device provided in the present invention.

FIG. 6 is a schematic structural diagram of another embodiment of a clock synchronization device provided in the present invention. As shown in FIG. 6, based on FIG. 5, when the first clock synchronization device is a clock server and the second clock synchronization device is a network device, the clock synchronization device further includes a sending module 404, and the message interaction module 403 includes a sending unit 601 and a second receiving unit 602, where: the sending unit 601 is configured to send a synchronization message to the network device at a first moment, where the synchronization message includes a timestamp recording the first moment, so that after the network device receives the synchronization message at a second moment, the network device extracts the first moment from the synchronization message, records the second moment, sends a time delay request message to the clock server at a third moment and meanwhile records the third moment; and the second receiving unit 602 is configured to receive the time delay request message at a fourth moment, and send a time delay response message to the network device, where the time delay response message includes a timestamp recording the fourth moment, so that the network device receives the time delay response message, extracts the fourth moment from the time delay response message, calculates a transmission delay according to the first moment, the second moment, the third moment, and the fourth moment, and adjusts a local clock according to the transmission delay, so as to achieve time synchronization with the clock server.

Furthermore, the above receiving module 401 is further configured to receive a synchronization request message for requesting clock synchronization sent by the network device; and the sending module 404 is configured to send a synchronization authorization message to the network device according to the synchronization request message, so as to respond to the synchronization request message.

Furthermore, the sending unit 601 sends the synchronization message to the network device at the first moment after the sending module 404 sends the synchronization authorization message.

The clock synchronization device is configured to execute the foregoing method embodiment, where the implementation principles are similar and are not described in detail herein.

In this embodiment, by establishing an MPLS TE tunnel whose bidirectional paths are consistent between the first clock synchronization device and the second clock synchronization device that perform clock synchronization message interaction, absolute symmetry of paths for receiving and sending a message between the first clock synchronization device and the second clock synchronization device is implemented; furthermore, by adopting a PTP clock synchronization principle, clock synchronization between the first clock synchronization device and the second clock synchronization device is easily implemented, and an error in the clock synchronization resulting from asymmetry of the paths for sending and receiving the message is avoided.

The clock synchronization devices provided in the embodiments of the present invention may implement the clock synchronization methods provided in the embodiments of the present invention, and have corresponding function modules and beneficial effects.

Figure 7:
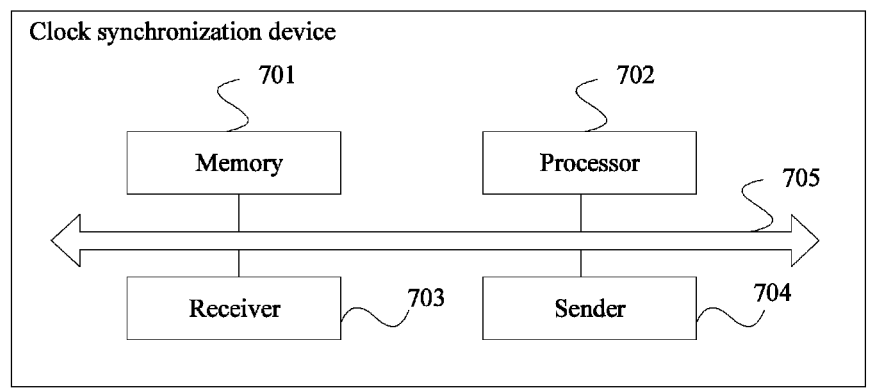
FIG. 7 is a schematic structural diagram of another embodiment of a clock synchronization device provided in the present invention.

FIG. 7 is a schematic structural diagram of another embodiment of a clock synchronization device provided in the present invention; the clock synchronization device may be the first clock device; and the clock synchronization device includes a memory 701, a processor 702, a receiver 703, a sender 704, and a bus 705 through which the memory 701, the processor 702, the receiver 703, and the sender 704 are connected.

Specifically, the memory 701 is configured to store an instruction set, and the processor 702 is configured to call the instruction set stored in the memory, so as to execute the following process: the processor 702 instructs the receiver 703 to receive a preconfigured MPLS capability parameter and a TE capability parameter, and the processor 702 establishes, based on the MPLS capability parameter and the TE capability parameter, an MPLS tunnel interface; and the processor 702 is further configured to establish, according to the MPLS tunnel interface, an MPLS TE tunnel whose bidirectional paths are consistent between a first clock synchronization device and a second clock synchronization device; and perform clock synchronization message interaction with the second clock synchronization device through the established MPLS TE tunnel.

It should be noted that the first clock synchronization device is a clock server, and the second clock synchronization device is a network device; or the first clock synchronization device is a network device, and the second clock synchronization device is a clock server.

Furthermore, when the first clock synchronization device is a clock server and the second clock synchronization device is a network device, the processor 702 instructs the receiver 703 to receive a unicast negotiation message including a bidirectional path consistency parameter and sent by the network device, where the unicast negotiation message is used to request authorization from the clock server, and the bidirectional path consistency parameter is used to negotiate on establishing an MPLS TE tunnel whose bidirectional paths are consistent. The processor 702 sends a unicast authorization message to the network device after the network device is authenticated according to the unicast negotiation message, so as to authorize the network device; and after the network device receives the unicast authorization message, establish the MPLS TE tunnel whose bidirectional paths are consistent between the clock server and the network device according to the bidirectional path consistency parameter and the MPLS tunnel interface.

Furthermore, when the first clock synchronization device is a clock server and the second clock synchronization device is a network device, the processor 702 instructs the sender 704 to send a synchronization message to the network device at a first moment, where the synchronization message includes a timestamp recording the first moment, so that after the network device receives the synchronization message at a second moment, the network device extracts the first moment from the synchronization message, records the second moment, sends a time delay request message to the clock server at a third moment and meanwhile records the third moment; and the receiver 703 receives the time delay request message at a fourth moment, and sends a time delay response message to the network device, where the time delay response message includes a timestamp recording the fourth moment, so that the network device receives the time delay response message, extracts the fourth moment from the time delay response message, calculates a transmission delay according to the first moment, the second moment, the third moment, and the fourth moment, and adjusts a local clock according to the transmission delay, so as to achieve time synchronization with the clock server.

In addition, the receiver 703 is further configured to receive a synchronization request message for requesting clock synchronization sent by the network device; and at this time, the sender 704 is configured to send a synchronization authorization message to the network device according to the synchronization request message, so as to respond to the synchronization request message. Specifically, the sender 704 sends the synchronization message to the network device at the first moment after sending the synchronization authorization message.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program codes, such as a read-only memory (ROM), a random-access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A clock synchronization method, comprising:
receiving, by a first clock synchronization device, a preconfigured multi-protocol label switching (MPLS) capability parameter and a traffic engineering (TE) capability parameter;
generating, based on the MPLS capability parameter and the TE capability parameter, an MPLS tunnel interface;
establishing, by the first clock synchronization device according to the MPLS tunnel interface, an MPLS TE tunnel Whose bidirectional paths are consistent between the first clock synchronization device and a second clock synchronization device; and
performing, by the first clock synchronization device, clock synchronization message interaction with the second clock synchronization device through the established MPLS TE tunnel.

2. The method according to claim 1, wherein the first clock synchronization device is a clock server, and the second clock synchronization device is a network device, or wherein the first clock synchronization device is a network device, and the second clock synchronization device is a clock server.

3. The method according to claim 2, wherein, when the first clock synchronization device is the clock server and the second clock synchronization device is the network device, establishing the MPLS TE tunnel whose bidirectional paths are consistent between the first clock synchronization device and the second clock synchronization device comprises:
receiving, by the clock server, a unicast negotiation message that comprises a bidirectional path consistency parameter and that is sent by the network device, wherein the unicast negotiation message is used to request authorization from the clock server, and wherein the bidirectional path consistency parameter is used to negotiate establishing the MPLS TE tunnel whose bidirectional paths are consistent;
sending, after the clock server authenticates the network device according to the unicast negotiation message, a unicast authorization message to the network device to authorize the network device; and
establishing, after the network device receives the unicast authorization message, the MPLS TE tunnel whose bidirectional paths are consistent between the clock server and the network device according to the bidirectional path consistency parameter and the MPLS tunnel interface.

4. The method according to claim 2, wherein, when the first clock synchronization device is the clock server and the second clock synchronization device is the network device, performing the clock synchronization message interaction with the second clock synchronization device through the established MPLS TE tunnel comprises:
sending, by the clock server, a synchronization message to the network device at a first moment, wherein the synchronization message comprises a timestamp recording the first moment such that after the network device receives the synchronization message at a second moment, the network device extracts the first moment from the synchronization message, records the second moment, sends a time delay request message to the clock server at a third moment and records the third moment;
receiving, by the clock server, the time delay request message at a fourth moment; and
sending, by the clock server, a time delay response message to the network device, wherein the time delay response message comprises a timestamp recording the fourth moment such that the network device receives the time delay response message, extracts the fourth moment from the time delay response message, calculates a transmission delay according to the first moment, the second moment, the third moment, and the fourth moment, and adjusts a local clock according to the transmission delay to achieve time synchronization with the clock server.

5. The method according to claim 4, wherein before sending synchronization message to the network device at the first moment, the method further comprises:
receiving, by the clock server, a synchronization request message for requesting clock synchronization sent by the network device; and
sending, by the clock server, a synchronization authorization message to the network device according to the synchronization request message to respond to the synchronization request message,
wherein sending, by the clock server, the synchronization message to the network device at the first moment comprises sending the synchronization message to the network device after the clock server sends the synchronization authorization message.

6. A clock synchronization device, comprising:
a receiving module configured to receive a preconfigured multi-protocol label switching (MPLS) capability parameter and a traffic engineering (TE) capability parameter, and establish, based on the MPLS capability parameter and the TE capability parameter, an MPLS tunnel interface;
a tunnel establishment module configured to establish, according to the MPLS tunnel interface, an MPLS TE tunnel whose bidirectional paths are consistent between a first clock synchronization device and a second clock synchronization device, wherein the clock synchronization device is the first clock synchronization device; and
a message interaction module configured to perform clock synchronization message interaction with the second clock synchronization device through the established MPLS TE tunnel.

7. The clock synchronization device according to claim 6, wherein the second clock synchronization device is a network device, or wherein the second clock synchronization device is a clock server.

8. The clock synchronization device according to claim 7, wherein, when the second clock synchronization device is the network device, the tunnel establishment module comprises:
a first receiving unit configured to receive, from the network device, a unicast negotiation message comprising a bidirectional path consistency parameter, wherein the unicast negotiation message is used to request authorization from the clock server, and wherein the bidirectional path consistency parameter is used to negotiate establishing the MPLS TE tunnel whose bidirectional paths are consistent; and
an establishment unit configured to:
after the network device is authenticated according to the unicast negotiation message, send a unicast authorization message to the network device to authorize the network device; and
after the network device receives the unicast authorization message, establish the MPLS TE tunnel whose bidirectional paths are consistent between the clock server and the network device according to the bidirectional path consistency parameter and the MPLS tunnel interface.

9. The clock synchronization device according to claim 7, wherein, when the second clock synchronization device is the network device, the message interaction module comprises:
   a sending unit configured to send a synchronization message to the network device at a first moment, wherein the synchronization message comprises a timestamp recording the first moment such that after the network device receives the synchronization message at a second moment, the network device extracts the first moment from the synchronization message, records the second moment, sends a time delay request message to the clock server at a third moment and records the third moment; and
   a second receiving unit configured to receive the time delay request message at a fourth moment and send a time delay response message to the network device, wherein the time delay response message comprises a timestamp recording the fourth moment such that the network device receives the time delay response message, extracts the fourth moment from the time delay response message, calculates a transmission delay according to the first moment, the second moment, the third moment, and the fourth moment, and adjusts a local clock according to the transmission delay to achieve time synchronization with the clock server.

10. The clock synchronization device according to claim 9, wherein the receiving module is further configured to receive a synchronization request message for requesting clock synchronization sent by the network device, wherein the clock synchronization device further comprises a sending module configured to send a synchronization authorization essage to the network device according to the synchronization request message to respond to the synchronization request message, and wherein the sending unit is configured to, after the sending module sends the synchronization authorization message, send the synchronization message to the network device at the first moment.

11. A non-transitory computer-readable edium having computer usable instructions stored thereon for execution by a processor, wherein the instructions cause the processor to:
   receive, by a first clock synchronization device, a preconfigured multi-protocol label switching (MPLS) capability parameter and a traffic engineering (TE) capability parameter;
   generate, based on the MPLS capability parameter and the TE capability parameter, an MPLS tunnel interface;
   establish, by the first clock synchronization device according to the MPLS tunnel interface, an MPLS TE tunnel whose bidirectional paths are consistent between the first clock synchronization device and a second clock synchronization device; and
   perform, by the first clock synchronization device, clock synchronization message interaction with the second clock synchronization device through the established MPLS TE tunnel.

12. The non-transitory computer-readable medium according to claim 11, wherein the first clock synchronization device is a clock server, and the second clock synchronization device is a network device, or wherein the first clock synchronization device is a network device, and the second clock synchronization device is a clock server.

13. The non-transitory computer-readable medium according to claim 12, wherein, when the first clock synchronization device is the clock server and the second clock synchronization device is the network device, the first clock synchronization device establishes the MPLS TE tunnel whose bidirectional paths are consistent between the first clock synchronization device and the second clock synchronization device by:
   receiving, by the clock server, a unicast negotiation message that comprises a bidirectional path consistency parameter and that is sent by the network device, wherein the unicast negotiation message is used to request authorization from the clock server, and wherein the bidirectional path consistency parameter is used to negotiate establishing the MPLS TE tunnel whose bidirectional paths are consistent;
   sending, after the clock server authenticates the network device according to the unicast negotiation message, a unicast authorization message to the network device to authorize the network device; and
   establishing, after the network device receives the unicast authorization message, the MPLS TE tunnel whose bidirectional paths are consistent between the clock server and the network device according to the bidirectional path consistency parameter and the MPLS tunnel interface.

14. The non-transitory computer-readable medium according to claim 12, wherein, when the first clock synchronization device is the clock server and the second clock synchronization device is the network device, the first clock synchronization device performs the clock synchronization message interaction with the second clock synchronization device through the established MPLS TE tunnel by:
   sending, by the clock server, a synchronization message to the network device at a first moment, wherein the synchronization message comprises a timestamp recording the first moment such that after the network device receives the synchronization message at a second moment, the network device extracts the first moment from the synchronization message, records the second moment, sends a time delay request message to the clock server at a third moment and records the third moment;
   receiving, by the clock server, the time delay request message at a fourth moment; and
   sending, by the clock server, a time delay response message to the network device, wherein the time delay response message comprises a timestamp recording the fourth moment such that the network device receives the time delay response message, extracts the fourth moment from the time delay response message, calculates a transmission delay according to the first moment, the second moment, the third moment, and the fourth moment, and adjusts a local clock according to the transmission delay to achieve time synchronization with the clock server.

15. The non-transitory computer-readable medium according to claim 14, wherein before the clock server sends the synchronization message to the network device at the first moment, the instructions further cause the process to:
   receive, by the clock server, a synchronization request message for requesting clock synchronization sent by the network device; and
   send, by the clock server, a synchronization authorization message to the network device according to the synchronization request message to respond to the synchronization request message,
   wherein the clock server sends the synchronization message to the network device at the first moment comprises sending the synchronization message to the network device at the first moment after the clock server sends the synchronization authorization message.

* * * * *